United States Patent [19]

Masutani et al.

[11] Patent Number: 5,401,574

[45] Date of Patent: Mar. 28, 1995

[54] SLIDING MEMBER AND COMPOSITION USABLE FOR THE FORMATION THEREOF

[75] Inventors: Noboru Masutani; Junichi Nakazono, both of Osaka, Japan

[73] Assignee: Nitto Denko Corporation, Osaka, Japan

[21] Appl. No.: 288,792

[22] Filed: Aug. 12, 1994

Related U.S. Application Data

[63] Continuation of Ser. No. 988,840, Dec. 10, 1992, abandoned.

[30] Foreign Application Priority Data

Dec. 10, 1991 [JP] Japan .................................. 3-350973

[51] Int. Cl.$^6$ ................................................. C08K 3/04
[52] U.S. Cl. ....................................... 428/338; 428/292;
428/339; 428/378; 428/391; 428/421; 428/422;
428/447; 428/908.8; 523/213; 523/215;
524/495; 252/12.4; 384/908; 384/911;
277/DIG. 6
[58] Field of Search .............. 428/292, 338, 339, 367,
428/375, 378, 391, 401, 421, 422, 447, 451,
908.8; 523/200, 213, 215; 524/495; 252/12.4;
384/908, 911; 277/DIG. 6

[56] References Cited

U.S. PATENT DOCUMENTS

| | | | |
|---|---|---|---|
| 4,303,735 | 12/1981 | Kehrer et al. | 428/391 |
| 4,610,918 | 9/1986 | Effenberger et al. | 428/245 |
| 4,865,910 | 9/1989 | Inoguchi et al. | 428/268 |
| 4,940,524 | 7/1990 | Perineau et al. | 204/242 |
| 4,972,764 | 11/1990 | Ohya et al. | 92/170.1 |
| 5,045,891 | 9/1991 | Senba et al. | 355/289 |
| 5,047,281 | 9/1991 | Betz et al. | 428/201 |
| 5,057,345 | 10/1991 | Barrett | 428/35.1 |
| 5,068,061 | 11/1991 | Knobel et al. | 252/511 |
| 5,098,627 | 3/1992 | Yoshikawa et al. | 264/235 |
| 5,100,722 | 3/1992 | Nakamura et al. | 428/263 |

FOREIGN PATENT DOCUMENTS

| | | |
|---|---|---|
| 211651 | 1/1990 | Japan . |
| 360857 | 9/1991 | Japan . |
| 4-224852 | 8/1992 | Japan . |
| 2218097 | 11/1989 | United Kingdom . |

*Primary Examiner*—Patrick J. Ryan
*Assistant Examiner*—Marie R. Macholl
*Attorney, Agent, or Firm*—Sughrue, Mion, Zinn, Macpeak & Seas

[57] ABSTRACT

A sliding member comprising a fluorine resin and carbon fibers treated with a fluorine-containing silane modifying agent represented by the formula $R^1$-$SiX_3$ wherein $R^1$ represents an alkyl group having from 1 to 10 carbon atoms, a part or the whole of the hydrogen atoms of which are replaced with fluorine atoms and X represents a hydrolyzable group or a chlorine atom.

9 Claims, No Drawings

SLIDING MEMBER AND COMPOSITION USABLE FOR THE FORMATION THEREOF

This is a Continuation of application Ser. No. 07/988,840, filed Dec. 10, 1992, now abandoned.

FIELD OF THE INVENTION

The present invention relates to a sliding member suitable for use by being built-in various instruments such as hydraulic apparatus, compressors, etc., and also to a composition usable for forming the sliding member.

BACKGROUND OF THE INVENTION

Bushes, piston rings, seal rings, etc., are built-in various instruments such as hydraulic apparatus, compressors, etc., and these members are required to have sliding characteristics (e.g., low friction, abrasion resistance, etc.).

For the uses which are required to have such sliding characteristics, a sliding member obtained by molding a composition comprising a fluorine resin compounded with glass fibers into a desired form is used by being built-in various instruments as a bush, a piston ring, a seal ring, etc.

As the fluorine resin composition or molded products thereof used for such sliding members, a composition comprising a fluorine resin powder having dispersed therein an inorganic filler such as glass fibers treated with a fluorine-containing silane coupling agent, carbon fibers, etc., and molded products comprising the composition are known as described in JP-A-2-11651 (the term "JP-A" as used herein means an "unexamined published Japanese patent application").

JP-B-3-60857 (the term "JP-B" as used herein means an "examined published Japanese patent application") describes a laminated plate obtained by immersing glass fibers pre-treated with a perfluoroalkylsilane represented by $CF_3$-$CH_2$-$CH_2$-$SiX_3$ (wherein X represents a hydrolyzable group such as an alkoxy group having from 1 to 4 carbon atoms), sintering the fluorine resin to provide a sheet, and laminating a definite number of these sheets.

Recently, for these various kinds of instruments, the requirement for the improvement of the reliability has been increased and as a matter of course, with such a requirement, the improvement of the performance has been also keenly desired for the sliding members being built-in these instruments. For example, it has been required for the sliding member to improve the abrasion resistance while keeping the low friction (prolonging the life by reducing the abraded amount) under severe use conditions, but conventional sliding members cannot meet the requirement.

That is, the above-described composition and the molded products described in JP-A-2-11651 may have an improved compressive strength but cannot attain the improvement of the abrasion resistance. Further, the laminated plate described in JP-B-3-60857 aims at the prevention of lowering of an electrical insulation resistance but there in no description therein about the abrasion resistance.

SUMMARY OF THE INVENTION

As the result of various investigations to overcome the above-described problems in the conventional techniques, the inventors have found that by using carbon fibers as the filler and applying a specific treatment to the carbon fibers, the abrasion resistance can be improved while keeping the low friction and a sliding member having a long life is obtained, and have succeeded in accomplishing the present invention.

Accordingly, one object of the present invention is to provide a sliding member.

Another object of the present invention is to provide a composition which can be used to form the sliding member.

The sliding member according to the present invention comprises a fluorine resin and carbon fibers treated with a fluorine-containing silane modifying agent represented by the formula $R^1$-$SiX_3$ wherein $R^1$ represents an alkyl group having from 1 to 10 carbon atoms, a part or the whole of the hydrogen atoms of which are replaced with fluorine atoms and X represents a hydrolyzable group such as an alkoxy group having from 1 to 4 carbon atoms, etc., or a chlorine atom.

DETAILED DESCRIPTION OF THE INVENTION

There is no particular restriction on the fluorine resin used as one component of the sliding member of the present invention. Examples thereof include polytetrafluoroethylene (PTFE), a tetrafluoroethylene-hexafluoropropylene copolymer (FEP), a tetrafluoroethylene-perfluoroalkyl vinyl ether copolymer (PFA), polyfluorotrifluoroethylene (PCTFE), and an ethylene-tetrafluoroethylene copolymer (ETFE). Those can be used alone or as mixtures thereof.

In the present invention, carbon fibers are mixed with the fluorine resin. Pitch series carbon fibers and PAN (polyacrylonitrile) series carbon fibers are known as carbon fibers and in the present invention, either of these carbon fibers can be used. The carbon fibers may be oxidized by the conventional treatment method such as a chemical oxidation, an electrolytic oxidation, a vapor-phase oxidation, etc.

It has been confirmed by the inventors' experiments that the carbon fibers having a diameter of from 1 to 20 $\mu$m, and preferably from 3 to 15 $\mu$m, and having an aspect ratio (the value of length:diameter) of from 1:1 to 50:1, and preferably from 3:1 to 40:1, are suitable in the present invention in the points of the dispersibility with the fluorine resin and the abrasion resistance of the sliding member obtained.

In the present invention, the carbon fibers are mixed with the fluorine resin as the indispensable component and in this case, it is important that the carbon fibers used are treated with a fluorine-containing silane modifying agent. The fluorine-containing silane modifying agent used in the present invention is represented by the formula $R^1$-$SiX_3$ wherein $R^1$ represents an alkyl group having from 1 to 10 carbon atoms, a part or the whole of the hydrogen atoms of which are replaced with fluorine atoms and X represents a hydrolyzable group such as an alkoxy group having from 1 to 4 carbon atoms, etc., or a chlorine atom.

Examples of the fluorine-containing silane modifying agent are trifluoropropyltrimethoxysilane, trifluoropropyltriethoxysilane, trifluoropropyltri($\beta$-methoxy)silane, 2-perfluorohexylethyltrimethoxysilane, 2-perfluorooctylethyltrimethoxysilane, and 2-perfluorooctylethyldimethoxymethylsilane.

The treatment of the carbon fibers with the fluorine-containing silane modifying agent may be carried out by a wet method or a dry method.

The wet method is a method of immersing the carbon fibers in a solution of the fluorine-containing silane modifying agent dissolved in a proper solvent such as water, acetic acid, ethanol, etc., separating the carbon fibers from the solution by filtration, etc., and then drying and heat-treating the carbon fibers. In this case, it is preferable that the concentration of the fluorine-containing silane modifying agent in the solution be controlled to from about 0.1 to 3% by weight and pH of the solution be controlled below 4. Further, the amount of the carbon fibers immersed in the solution is preferably from 1 to 50 parts by weight per 100 parts by weight of the solution for quickening and ensuring the treatment. The immersion time of the carbon fibers in the solution depends upon the temperature of the solution, etc., but is usually from about 10 to 60 minutes. Also, the heat treatment can be carried out at a temperature of from about 100° C. to 180° C. for from about 1 to 30 minutes.

On the other hand, the dry method can be carried out by uniformly mixing the carbon fibers and the fluorine-containing silane modifying agent by a mixer, etc. In this case, the mixing ratio of both the components is usually from 0.1 to 3 parts by weight of the fluorine-containing silane modifying agent to 100 parts of the carbon fibers. In the case of the drying method, it is not always necessary to separate the fluorine-containing silane modifying agent after the treatment and the mixture containing the modifying agent can be molded. In the case of obtaining the sliding member, since a high temperature of higher than the melting point of the fluorine resin is employed, almost all of the fluorine-containing silane modifying agent remaining in the mixture is decomposed off at the high temperature. Also, when the fluorine-containing silane modifying agent remains in the sliding member obtained without being decomposed off, the modifying agent does not adversely affect the properties of the sliding member.

The reason why the sliding member having the excellent characteristics is obtained by mixing the fluorine resin and the carbon fibers treated with the fluorine-containing silane modifying agent has not yet been clarified but the effect of the present invention has been confirmed as shown in the examples described below.

The sliding member of the present invention comprises a mixture of the fluorine resin and the carbon fibers treated with the fluorine-containing silane modifying agent as indispensable components. The compounding ratio of both the components variously changes by the kinds, etc., of the fluorine resin and the carbon fibers but the content of the carbon fibers is usually from 1 to 30 parts by weight, and preferably from 3 to 20 parts by weight, per 100 parts by weight of the fluorine resin. If the content of the carbon fibers is too small, the abrasion resistance of the sliding member obtained is not improved, while if the content of the carbon fibers is too large, the sliding member obtained becomes brittle.

In the present invention, if desired, various additives can be compounded with the mixture. Examples of the additives are fillers such as glass fibers, glass flakes, inorganic whiskers (silicon carbide, silicon nitride, alumina fibers, etc.), metal powders (copper powder, zinc powder, aluminum powder, brass powder, etc.), metal compound powders (aluminum hydroxide powder, magnesium hydroxide powder, zinc borate powder, etc.), etc.; solid lubricants such as molybdenum disulfide, boron nitride, graphite, etc.; and resin powders, such as a polyimide powder, a polyphenylene sulfide powder, a polyparaoxybenzyl powder, a silicone powder, etc.

In the case of compounding additives, it is preferred that the content of the additives in the sliding member be from about 1 to 30% by weight based on the weight of the sliding member. If the content of the additives is too much, the sliding member becomes brittle.

The sliding member of the present invention can be obtained by the same method as a conventionally employed molding method of a fluorine resin. For example, the sliding member can be produced by a method of uniformly mixing the fluorine resin powder and the carbon fibers treated with the fluorine-containing silane modifying agent, placing the mixture in a mold, molding the mixture under the condition of from 300 to 600 kg/cm$^3$, removing the molded product from the mold, and sintering the product at a temperature of higher than the melting point of the fluorine resin. As a matter of course, the molded product obtained by this method can be further shaped into a desired form. For example, a rod-form product or a cylindrical product is obtained by the method and the product can be cut into a spiral sliding member, a tabular sliding member, a ring-form sliding member, etc.

The present invention is described more practically by the following examples.

EXAMPLE 1

In a solution of 10 g of trifluoropropyltrimethoxysilane dissolved in 1,000 g of an aqueous solution of 0.2% by weight of acetic acid was added 100 g of carbon fibers (PAN series) having a diameter of 7 $\mu$m and a mean length of 30 $\mu$m followed by stirring. The carbon fibers were separated from the solution by filtration. After air-drying the carbon fibers, the carbon fibers were heated to 140° C. for 10 minutes to provide carbon fibers treated with the fluorine-containing silane modifying agent.

425 g of a PTFE powder (molding powder), 50 g of the treated carbon fibers obtained above, 12.5 g of boron nitride, and 12.5 g of molybdenum disulfide were uniformly mixed by a Henschel mixer. 150 g of the resulting mixture was placed in a cylindrical mold having a length of 300 mm and an inside diameter of 30 mm. After pressing the mixture at a pressure of 600 kg/cm$^2$ at room temperature (about 25° C.) for 2 minutes, the molded product was taken out from the mold and sintered at a temperature of 370° C. for 8 hours to provide a rod-form sliding member.

EXAMPLE 2

By following the same procedure as in Example 1 except that 2-perfluorooctylethyltrimethoxysilane was used in place of trifluoropropylmethoxysilane and also a mixture of methanol and a 2 wt % aqueous acetic acid solution in a weight ratio of 9:1 was used as the solvent for the fluorine-containing silane modifying agent, a sliding member was obtained.

EXAMPLE 3

By following the same procedure as in Example 1 except that carbon fibers having a diameter of 7 $\mu$m and a mean length of 130 $\mu$m was used, a sliding member was obtained.

EXAMPLE 4

By following the same procedure as in Example 1 except that pitch series carbon fibers having a diameter of 12.5 μm and a mean length of 110 μm, a sliding member was obtained.

EXAMPLE 5

In 10 liters of an aqueous nitric acid solution (concentration: 60% by weight) were placed 60 g of pitch series carbon fibers having a diameter of 12.5 μm and a mean length of 110 μm and the oxidation treatment was carried out at 130° C. for 24 hours. After the oxidation treatment, the carbon fibers were washed with ion exchanged water and dried at 130° C. for 24 hours. Then, by following the same procedure as in Example 1 except that the dry carbon fibers were used, a sliding member was obtained.

EXAMPLE 6

By following the same procedure as in Example 1 except that boron nitride and molybdenum disulfide were not used, a sliding member was obtained.

EXAMPLE 7

425 g of a PTFE powder (molding powder), 50 g of carbon fibers (PAN series, diameter of 7 μm, mean length of 30 μm), 12.5 g of boron nitride, 112.5 g of molybdenum disulfide and 1 g of trifluoropropyltriethoxysilane were uniformly mixed by a Henschel mixer. The resulting mixture was molded in the same manner as in Example 1 to obtain a sliding member.

COMPARATIVE EXAMPLE 1

By following the same procedure as in Example 1 except that the carbon fibers were not treated with the fluorine-containing silane modifying agent, a sliding member was obtained.

COMPARATIVE EXAMPLE 2

By following the same procedure as in Example 5 except that the carbon fibers were not treated with the fluorine-containing silane modifying agent, a sliding member was obtained.

Each of the sliding members obtained in the above-described examples and comparative examples was cut into a cylindrical sample having an outside diameter of 25.6 mm, an inside diameter of 20mm, and a height of 15 mm and each sample was subjected to tests of the kinetic friction coefficient and the abrasion loss. The results obtained are shown in Table 1 below.

For the tests, a Matsubara type friction and abrasion test apparatus was used, cast iron was used as the opposite material, and the kinetic friction coefficient and the abrasion loss were measured by a ring-on-ring system under the conditions of a sliding speed of 0.5 meter/sec., a surface pressure of 15 kg/cm$^2$, and a heating temperature of 100° C. in the presence of a refrigerating machine oil.

The kinetic friction coefficient is the value of reaching a stationary state and the abrasion loss is shown by the reduced amount (μm) of the height of the sample after continuously sliding for 2 hours.

TABLE 1

| | Kinetic Friction Coefficient | Abrasion Loss (μm) |
|---|---|---|
| Example 1 | 0.105 | 25 |
| Example 2 | 0.106 | 28 |
| Example 3 | 0.112 | 22 |
| Example 4 | 0.109 | 28 |
| Example 5 | 0.110 | 20 |

TABLE 1-continued

| | Kinetic Friction Coefficient | Abrasion Loss (μm) |
|---|---|---|
| Example 6 | 0.111 | 29 |
| Example 7 | 0.106 | 28 |
| Comparative Example 1 | 0.105 | 48 |
| Comparative Example 2 | 0.110 | 44 |

As described above, since according to the present invention, a mixture of the fluorine resin and the carbon fibers treated with a fluorine-containing modifying agent is used, a sliding member having an excellent abrasion resistance while maintaining a low friction can be provided.

While the invention has been described in detail and with reference to specific embodiments thereof, it will be apparent to one skilled in the art that various changes and modifications can be made therein without departing from the spirit and scope thereof.

What is claimed is:

1. A sliding member comprising a mixture of fluorine resin and carbon fibers treated with a fluorine-containing silane modifying agent represented by the formula $R^1$-SiX$_3$ wherein $R^1$ represents an alkyl group having from 1 to 10 carbon atoms, a part or the whole of the hydrogen atoms of which are replaced with fluorine atoms and X represents a hydrolyzable group or a chlorine atom, wherein the carbon fibers have a diameter of from 1 to 20 μm and an aspect ratio of from 1:1 to 50:1, and wherein the amount of the carbon fibers is from 1 to 30 parts by weight per 100 parts by weight of the fluorine resin.

2. A sliding member as claimed in claim 1, wherein the fluorine resin is at least one member selected from the group consisting of a polytetrafluoroethylene, a tetrafluoroethylene/hexafluoropropylene copolymer, a tetrafluoroethylene/perfluoroalkylvinyl ether copolymer, a polychlorotrifluoroethylene, and an ethylene/-tetrafluoroethylene copolymer.

3. A sliding member as claimed in claim 1, wherein the carbon fibers have a diameter of from 3 to 15 μm.

4. A sliding member as claimed in claim 1, wherein the carbon fibers have an aspect ratio of from 3:1 to 40:1.

5. A sliding member as claimed in claim 1, wherein the fluorine-containing silane modifying agent is selected from the group consisting of trifluoropropyltrimethoxysilane, trifluoropropyltriethoxysilane, trifluoropropyltri(β-methoxyethoxy)silane, 2-perfluorohexylethyltrimethoxysilane, 2-perfluorooctylethyltriethoxysilane and 2-perfluorooctylethyldimethoxymethylsilane.

6. A sliding member as claimed in claim 1, wherein the hydrolyzable group is an alkoxy group having 1 to 4 carbon atoms.

7. A sliding member as claimed in claim 1, wherein the amount of the carbon fibers is from 3 to 20 parts by weight per 100 parts by weight of the fluorine resin.

8. A composition for producing a sliding member, said composition comprising a fluorine resin and carbon fibers treated with a fluorine-containing silane modifying agent represented by the formula $R^1$-SiX$_3$ wherein $R^1$ represents an alkyl group having from 1 to 10 carbon atoms, a part or the whole of the hydrogen atoms of which are replaced with fluorine atoms and X represents a hydrolyzable group or a chlorine atom, wherein the carbon fibers have a diameter of from 1 to 20 μm and an aspect ratio of from 1:1 to 50:1, and wherein the amount of the carbon fibers is from 1 to 30 parts by weight per 100 parts by weight of the fluorine resin.

9. A sliding member as claimed in claim 1, further comprising a lubricant.

* * * * *